Dec. 20, 1938. R. S. SANFORD 2,140,768
BRAKE
Original Filed July 8, 1932

INVENTOR
ROY S. SANFORD
BY
ATTORNEY

Patented Dec. 20, 1938

2,140,768

UNITED STATES PATENT OFFICE 2,140,768

BRAKE

Roy S. Sanford, New York, N. Y., assignor to Bendix Aviation Corporation, South Bend, Ind., a corporation of Delaware Original application July 8, 1932, Serial No. 621,445, now Patent No. 2,078,210, dated April 20, 1937. Divided and this application July 6, 1936, Serial No. 88,977

4 Claims. (Cl. 188—78)

This invention relates to brakes and is illustrated as embodied in an internal expanding brake for an automobile wheel.

In automotive vehicle brakes of the servo type wherein efficient servo action is present in both directions of rotation there is usually present a floating shoe which must float to anchor at one end or the other with changes in rotation, producing a tendency to "click" at such times as the floating shoe floats to anchor. This invention is more particularly directed to provision of a novel construction wherein the shoe, although of the floating type, is restricted in its floating movement but nevertheless may afford the characteristics of a shoe that is freely floating.

An object of the invention is to provide a servo brake utilizing a full length band servo operable in either direction but free from click.

A still further object is the provision of novel details of brake construction, including an internal band brake shoe provided with a second band lying against and adapted to expand the internal shoe.

The above and other novel features of the invention will appear more fully hereinafter from the following detailed description when taken in connection with the accompanying drawing. It is expressly understood, however, that the drawing is employed for purposes of illustration only and is not designed as a definition of the limits of the invention, reference being had for this purpose to the appended claims.

In the drawing wherein similar reference characters refer to similar parts throughout the several views.

Figures 2, 3:
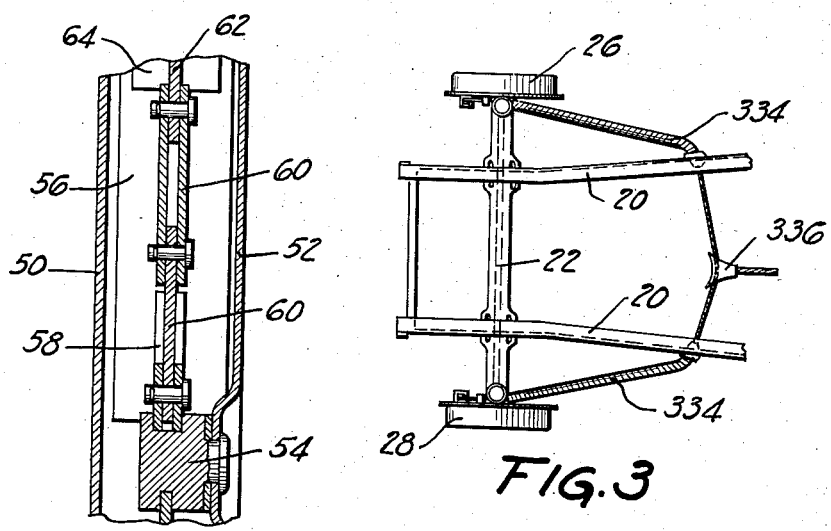
Figure 2 is a section through the operating linkage and anchor thereof taken on the line 2—2 of Figure 1.
Figure 3 is a plan view of the front end of an automobile chassis, showing operating mechanism for the brake.

Referring more in detail to Figure 3, there is shown therein a chassis 20 having a front axle 22 provided with front wheel brakes 26 and 28. A cable and conduit operating mechanism 334 is connected to these brakes, the cable being movably engaged by an equalizer yoke 336 or the like, operated in any desired manner.

Figure 1:
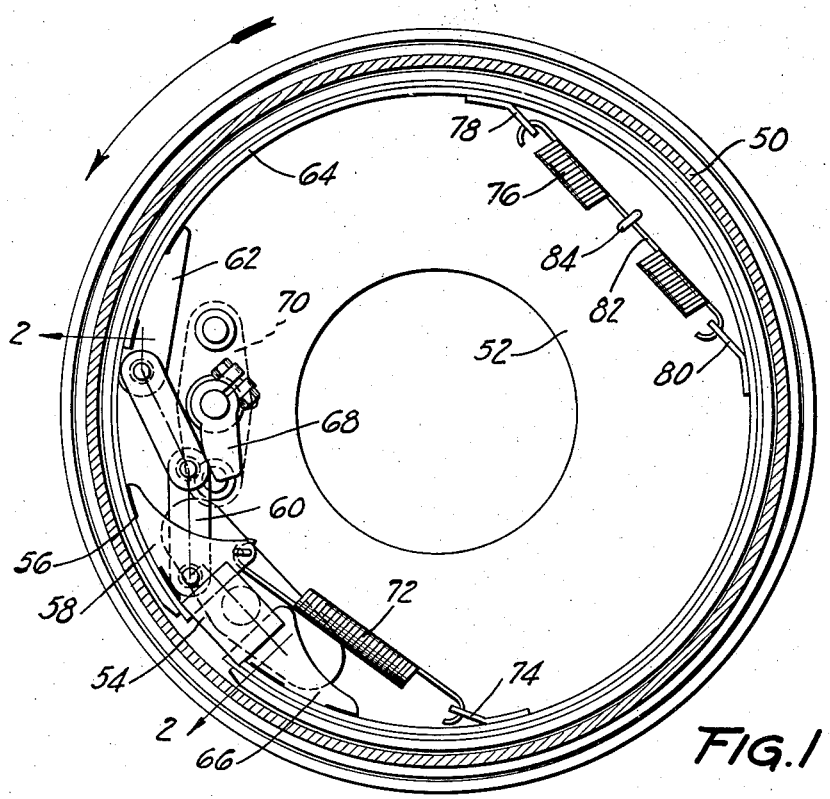
Figure 1 is a vertical section, just inside the head of the drum, of a brake constructed in accordance with this invention.

The novel brake illustrated in Figures 1 and 2 includes a brake drum 50, a backing plate 52, and an anchor 54. A shoe 56 carrying a friction lining thereon is provided in the form of a flexible band extending substantially the entire circumference of the drum. One end of the shoe 56 is provided with a shoulder 58 which is adapted to engage the anchor 54. For the purpose of applying the brake there is pivoted in the shoulder 58 one end of a toggle 60 which acts on its other end upon a web portion 62 welded or otherwise secured to a second band 64 which extends around the brake and by means of the shoulder 66, engages the anchor 54.

An actuating cam 68 pivoted in a reinforcing bearing 70 secured to the backing plate 52 is adapted to engage the knee of the toggle 60 and upon rotation thereof expand the inner band 64 of the brake. A spring 72 linked between the shoulder 58 of the brake shoe and a hook 74 secured on the inner band 64 is adapted to retain both bands in engagement with the anchor. A second spring 76 tensioned between two hooks 78 and 80 upon the inner band 64 is adapted, by means of a straight section 82 which in turn passes through a guide member 84 secured to the backing plate to retain the brake or the friction elements normally in disengaged position.

Operation of the brake will be seen to be as follows: Should the drum be turning in the direction of the arrow, and the toggle 60 actuated by the cam 68, it will be seen that the inner band 64 will be expanded pressing the brake shoe band into engagement with the drum, the spring 72 which constantly holds the brake band against the anchor 54 preventing any possibility of click during rotation in this direction. During this action, slipping between the band 64 and the brake band 56 takes place since the expanding band must move in the direction opposite from that indicated by the arrow. During opposite rotation, the toggle 60 operates to thrust the inner band 64 against the anchor 54 at its other end, and at the same time retain the shoe 56 against the anchor 54, thus preventing click during this direction of rotation. As the braking pressure increases, the pressure between the inner band 64 and the brake band 56 increases thereby subsequently tending to prevent slipping between these members, and thus aiding in holding the brake band 56 against the anchor 54, but nevertheless, tending to cause the shoe 56 to anchor through the expanding band 64, its shoulder 66 and the right-hand side of the anchor 54 thereby providing servo brake characteristics in both directions of rotation while still retaining the brake shoe at one end constantly in anchor engagement.

Though only one embodiment of the invention has been illustrated and described, it is to be understood that the invention is not limited thereto, but may be embodied in various mechanical forms and combinations as may be desired. As various changes in construction and arrangement of parts may be made without departing from the spirit of the invention, as will be apparent to those skilled in the art, reference will be had to the appended claims for a definition of the limits of the invention.

The present application is a division of my application No. 621,445, filed July 8, 1932, now Patent No. 2,078,210, dated April 20, 1937.

I claim:

1. A brake comprising a drum, a backing plate, an anchor thereon, a flexible band friction shoe having one end engaging said anchor and its other end free, a second band within said friction shoe having one end anchored upon the reverse side of said anchor, and means to thrust the other end of said second band away from said anchor to actuate the said brake.

2. A brake comprising a drum, a brake band within said drum, a second applying band in engagement with said brake band and adapted to expand said brake band, and an anchor engaged on one side by one end of the first band and engaged on the other side by the other end of the second band.

3. A brake comprising a flexible brake band, an actuating band substantially coextensive therewith, an anchor in engagement with one end of said brake band and the other end of said actuating band, and an expanding means between said anchor and the free end of said actuating band.

4. A brake comprising a drum, a backing plate, an anchor secured thereon, a friction band having one end abutting said anchor, a substantially coextensive applying band abutting said anchor at one end, and a toggle connected to the other end of said applying band and reacting against said friction band end and said anchor, for thrusting said band against said anchor.

ROY S. SANFORD.